June 18, 1968    M. E. ULLMAN, JR    3,389,033
APPARATUS AND METHOD OF MAKING PLASTIC COVERED CABINET DOORS
Filed May 11, 1964    2 Sheets-Sheet 1
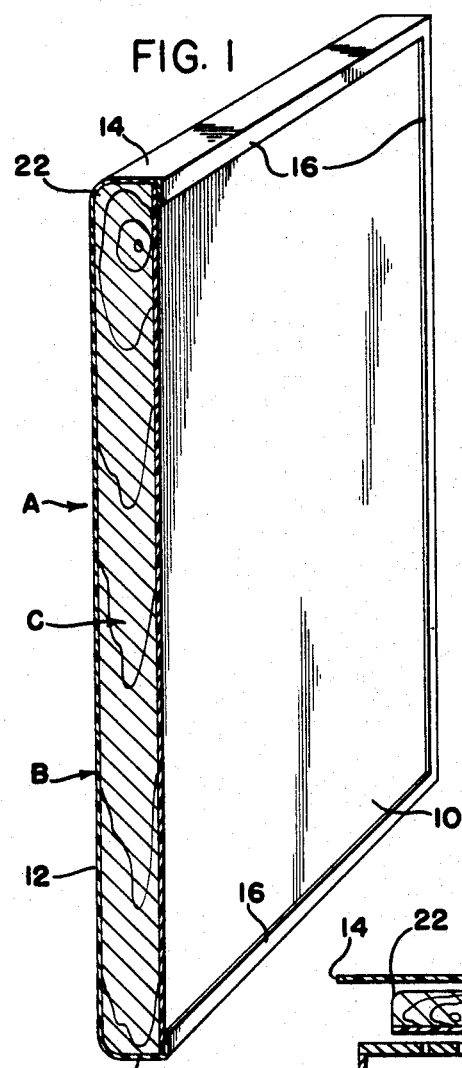
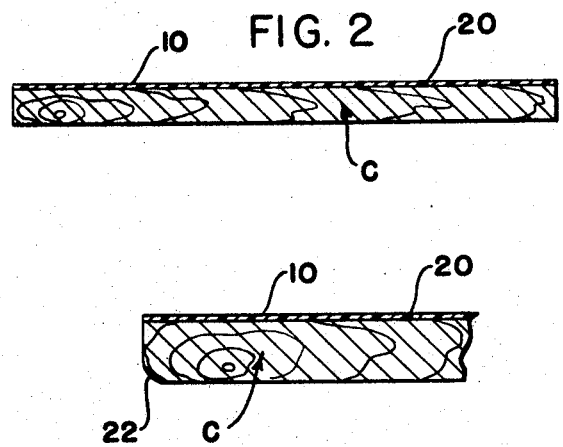
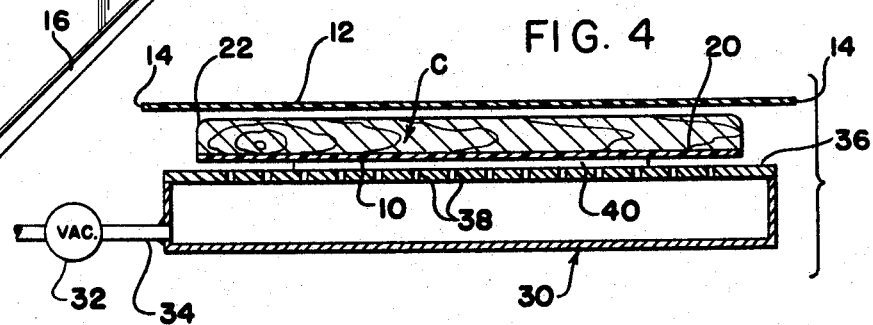
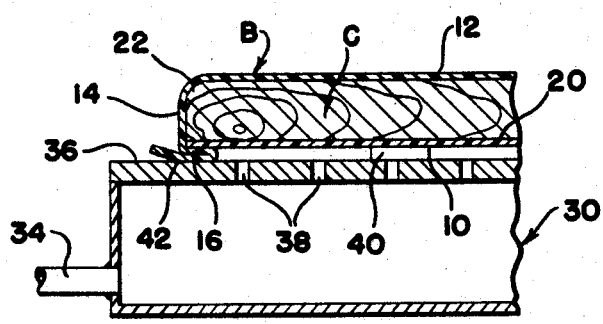
INVENTOR.
MYRON E. ULLMAN
BY Tilberry & Body
ATTORNEYS

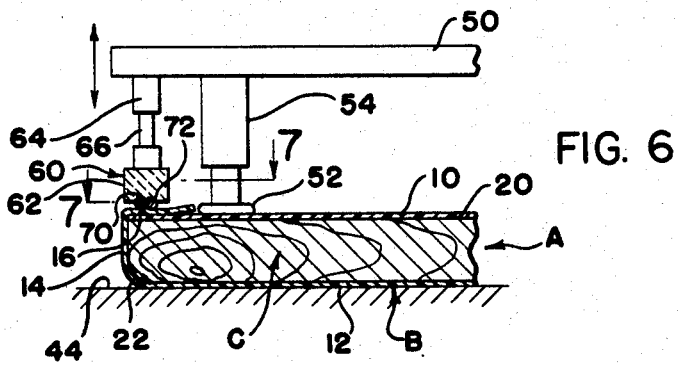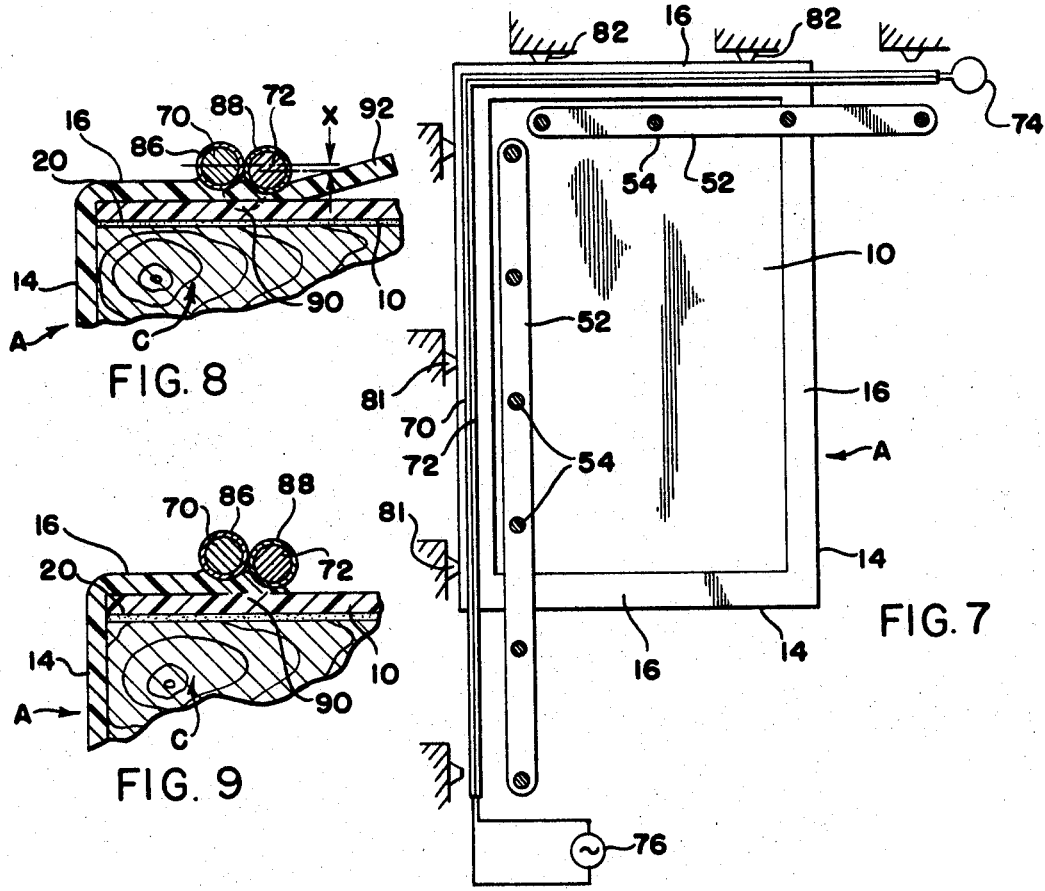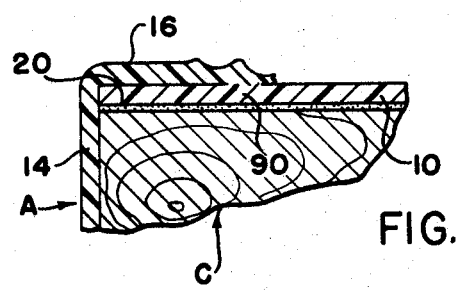

3,389,033
APPARATUS AND METHOD OF MAKING
PLASTIC COVERED CABINET DOORS
Myron E. Ullman, Jr., Canfield, Ohio, assignor to Mullins
Manufacturing Corporation, Salem, Ohio, a corporation
of Delaware
Filed May 11, 1964, Ser. No. 366,468
6 Claims. (Cl. 156—216)

ABSTRACT OF THE DISCLOSURE

There is provided an apparatus and method of providing a thin plastic covering on a flat core which involve applying a first plastic sheet to one surface of the core and vacuum forming another plastic sheet on the opposite surface of the core, with the marginal portion of the second sheet being formed around the edge of the core and providing an overlapped joint with the first sheet and on the one surface of the core. This overlapped joint is heat sealed with two generally separate, parallel heating elements so that only the material of the sheets between the elements is melted and fused.

---

This invention pertains to the art of doors of the general type used for kitchen cabinets, or similar cabinets, structures and more particularly to an apparatus and method of making plastic covered cabinet doors.

The invention is particularly applicable to the manufacture of cabinet doors and it will be described with particular reference thereto; however, it will be appreciated that the invention has much broader applications and may be used in the manufacture of various articles which are to be covered or encapsulated within thin plastic sheet material.

It has become somewhat common practice to manufacture kitchen cabinet doors with an outer, decorative plastic covering applied to an inner core of relatively inexpensive material, such as pressed board or other composition core stock, so that the decorative covering can impart a pleasing appearance to the otherwise plain core. These decorative plastic coverings have various textures and colors so that a door manufactured by this general process may have a variety of appearances. When manufacturing a door with an outer plastic covering, difficulty has been experienced in applying the plastic covering to the inner core. In addition, after the covering is applied, it has been found that such a covering often does not withstand extreme environmental conditions or extremely rough usage.

One prior method of applying a thin plastic sheet or covering to an inner core to form a cabinet door involved gluing formica on the inner and outer surfaces of the core and then applying an extruded molding strip around the edges of the core. This method was not completely satisfactory because variations in the thickness of the core, caused by the normal manufacturing tolerances, often made it difficult to completely match the extruded molding with the core. Consequently, the molding had to be trimmed by hand, which substantially increased the cost of the cabinet door.

Another method of applying an outer plastic covering to an inner core involved gluing formica on the outer and inner surfaces of the core in a manner similar to the method explained above. Thereafter, a thin strip of formica was glued around the edge of the core to extend from the formica on the outside surface of the core to the formica on the inside surface of the core. This method was not completely satisfactory because the expensive manual operation of trimming the formica joints at the edges of the core substantially increased the cost of the cabinet door. In addition, if this trimming operation was not performed with a high degree of skill, an unsightly edge would result so that the door was not acceptable for the general market.

To overcome the disadvantages of the methods described above, it has been suggested to glue a plastic sheet on the inside surface of the core and, thereafter, vacuum form a plastic sheet on the outside surface of the core with the marginal edges of the outside vacuum formed sheet being wrapped around the edges of the core. This method also had inherent disadvantages. For instance, since the plastic material which was adapted for vacuum forming around the core was heat sensitive, i.e. it would shrink when subjected to increased temperatures, the plastic sheet would shrink when the door was used in climates having relatively high temperatures. This shrinkage caused unsightly cracks around the edges of the door.

These and other disadvantages of the prior methods utilized for applying a plastic, decorative covering to a core for forming a cabinet door are completely overcome by the present invention which is directed toward an apparatus and method for applying a plastic, decorative covering on a generally flat article, such as a kitchen cabinet door, which apparatus and method do not require expensive hand operations and will produce a covering on a generally flat article, such as a kitchen cabinet door, which apparatus and method do not require expensive hand operations and will produce a covering that withstands extreme environmental conditions and abusive use.

In accordance with the present invention there is provided an apparatus for heat sealing two overlapping layers of thermoplastic material along a preselected seam, the apparatus comprises means for supporting the first of the layers, a pair of parallel heating elements having a planar contour corresponding to the shape of the preselected seam, means for forcing the elements against the second of the layers and means for heating the parallel elements to a temperature sufficient to substantially liquefy a portion of each of the layers between the elements.

This apparatus for heat sealing overlapping layers is utilized, in accordance with the invention, for bonding a plastic sheet which covers the inside surface of a kitchen cabinet door with a plastic sheet which covers the outside surface of the door. The heat seal or bond takes place adjacent the periphery of the inside surface of the door where an overlapping joint is formed by wrapping the marginal edges of the sheet on the outside surface of the door around the edges of the door and into overlapping relationship with the sheet on the inside surface of the door.

In accordance with another aspect of the present invention, there is provided a method of producing a plastic covered generally flat article, such as a kitchen cabinet door. The method comprises the steps of providing a core having the general shape of the article, applying a thermoplastic layer on one side of the core, aplying a thermoplastic layer on the other side of the core with the margins being wrapped around the core and forming an overlapping joint with the first mentioned layer, holding the layers in overlapping relationship, heating the layers in unison along this joint to a substantially liquid state while they are held in overlapping relationship and, then, allowing the layers to cool.

The primary object of the present invention is the provision of an apparatus and method for applying a decorative, plastic covering onto a generally flat article, such as a kitchen cabinet door, which apparatus and method are economical and produce a covering that withstands extreme environmental conditions and abusive use.

Another object of the present invention is the provision of an apparatus and method of applying a decorative, plastic covering onto a kitchen cabinet door, which apparatus and method involves applying a first plastic sheet onto one surface of the door, applying a second plastic sheet onto the other surface of the door and heat sealing the edges of the two sheets together to form a substantially moisture free capsule around the door.

Still another object of the present invention is the provision of an apparatus and method of applying a decorative plastic covering onto a generally flat article, such as a kitchen cabinet door, which apparatus and method involves the heat sealing of two overlapping thermoplastic sheets or layers along a seam by pressing two parallel heating elements against the overlapping sheets and coterminous with the desired seam and, then, heating the elements to substantially liquefy a portion of both sheets between the elements so that the substantially liquefied portions can solidify upon subsequent cooling to form a bond between the sheets.

These and other objects and advantages will become apparent from the following description used to illustrate the preferred embodiment of the present invention as read in connection with the accompanying drawings in which:

FIGURE 1 is a cross-sectioned, schematic pictorial view illustrating a kitchen cabinet door constructed in accordance with the present invention;

FIGURE 2 is a cross-sectioned, side elevational view illustrating an initial operating step in accordance with the invention;

FIGURE 3 is a partial cross-sectional view illustrating a further operating step in accordance with the invention;

FIGURE 4 is a schematic, cross-sectional, side elevational view illustrating a further operating step in accordance with the present invention;

FIGURE 5 is a partial, cross-sectional view illustrating still a further operating step in accordance with the invention;

FIGURE 6 is a schematic, partial side elevational view illustrating yet another operating step in accordance with the present invention;

FIGURE 7 is a schematic, cross-sectional view taken generally along line 7—7 of FIGURE 6; and FIGURES 8–10 are enlarged, partial cross-sectional views illustrating in detail the heat sealing step in accordance with the present invention.

Referring now to the drawings wherein the showings are for the purpose of illustrating a preferred embodiment of the invention only and not for the purpose of limiting same, FIGURE 1 shows a generally flat article A, which in accordance with the illustrated embodiment of the present invention is a kichen cabinet door. The door is provided with an outer decorative plastic covering B surrounding and encapsulating an inner core C formed from a relatively inexpensive core stock, such as compressed or composition board. The decorative covering B is formed from a plastic sheet 10 on the inside surface of core C and a plastic sheet 12 on the outside surface of the core. The plastic sheets are formed from a thermoplastic material, such as a vinyl, and they have a thickness which is somewhat exaggerated in FIGURE 1. In practice, the plastic sheets 10, 12 are formed from a vinyl having a thickness of approximately 0.010 inch. The outside plastic sheet 12 has marginal edges 14 which are wrapped around the edges of core C to form an overlapping joint 16 with the marginal edges of the inside sheet 10. The plastic sheets 10, 12 are permanently bonded at the overlapping joint 16 by a novel heat sealing apparatus and method forming a substantial portion of the present invention and which will be described hereinafter in detail.

In order to appreciate the various aspects of the present invention, the operating steps utilized, in accordance with the preferred embodiment of the present invention, to produce the plastic covered door A will be hereinafter set forth. Referring now to FIGURE 2, the core C is initially covered on one surface with an adhesive layer 20 and the inside plastic sheet 10 is pressed against the core so that the adhesive layer securely bonds the sheet 10 onto the inside surface of the core. Thereafter, as shown in FIGURE 3, the edges of core C are machined, by an appropriate apparatus, to produce the desired contour 22 along the edges of the core. Any appropriate machine could be utilized and it is possible to contour the inside surface as well as the outside surface as shown in FIGURE 3.

Referring now to FIGURES 4 and 5, the core C with sheet 10 adhered to one side thereof is positioned over vacuum plenum chamber 30 connected to a vacuum developing device 32, which may take the form of a vacuum pump, by pipe 34. Between the plenum chamber and core C there is provided a plate 36 having a plurality of randomly arranged perforations 38 for communicating the plenum chamber with the area surrounding the core C. The core is positioned slightly above the perforated plate 36 on a support 40 which may take a variety of structural forms. For instance, the support may be a plurality of projections extending outwardly from the face of the plate 36. The outside surface of core C is provided with an adhesive coating and the outside sheet 12 is heated to a heat deformation temperature. Thus, when sheet 12 is positioned over core C and a vacuum is created within chamber 30, the plastic sheet 12 is formed tightly around the core and the marginal edges 14 are drwn inwardly around the inside surface of the core to form the overlapping joint 16 as is shown in FIGURE 5. Since the sheet 12 is heated to a heat deformation temperature, the sheet will take the shape of the core as the vacuum draws the sheet around the core. After the sheet has cooled, the shape imparted during the vacuum forming will remain. The marginal edge 14 will have an outwardly extending portion 42 which is cropped from sheet 12 before the next operating step in the illustrated method.

Referring now to FIGURES 6 and 7, the core C is supported on an appropriate support structure 44 so that the overlapping joint 16 faces upwardly. Above door A there is provided a movable platen 50 adapted to support clamp bars 52 by a plurality of pressure devices 54 (see FIGURE 7). After the movable platen is secured into the proper vertical position with respect to the inside surface of door A, the pressure devices 54 force clamp bars 52 downwardly against the door. This downward pressure straightens the door, if there happens to be any warpage of the core C.

Juxtaposed to clamp bars 52 is a heating head 60 having a support block 62 generally coterminous with overlapping joint 16 and supported onto platen 50 by a plurality of pressure cylinders 64 (only one of which is shown). The pressure cylinders are joined onto the support block 62 by rod 66 so that the block can be forced downwardly toward joint 16 with a force determined by the pressure of a fluid within cylinder 64. The support block is formed from an electrical insulation material and support two parallel heating elements 70, 72 which run along the support block and are coterminous with the joint 16.

Referring now to FIGURE 7, the heating elements are connected at one end by an electrical shunt 74 and are connected at the other end to the output leads of an electrical power source, schematically represented as generator 76. The heating elements extend in two separate legs forming a generally right angle and a clamp bar 52 is provided along each of the heating element legs. By this arrangement of the heating elements and the clamp bars, a rectangular door A can have the four sides of the overlapping joint 16 heat sealed, in a manner to be hereinafter described in detail, by only two separate cycles. One cycle seals two sides of joint 16 adjacent one corner and the next cycle seals two sides of joint 16 adjacent the diagonally opposite corner. Also, by arranging the heating element as shown in FIGURE 7, the dimensions of door A are not limiting and the same apparatus can be utilized for sealing the overlapping joint 16 of a small or a large door. Two sets of locators 80, 82, are positioned in a parallel relationship with respect to the heating elements 70, 72 so that the door can be easily located with respect to the heating elements with the elements directly over the overlapping joint 16. It is appreciated that various structural modifications can be made in the schematically illustrated embodiment of the invention without departing from the intended spirit and scope of the present invention.

An important aspect of the present invention is the use of two parallel heating elements for heat sealing the overlapping joint 16 between marginal edge 14 of sheet 12 and the marginal edge of sheet 10. The heat sealing function of the parallel heating elements is illustrated in FIGURES 8–10. Referring to FIGURE 8, after the core is positioned below platen 50 and the clamping bars 52 have straightened the core, the heating elements 70, 72 are forced downwardly against the marginal edge 14 of sheet 12. This forms a holding force between the plastic sheets forming the overlapping joint 16. Thereafter, the generator 76 passes a current through heating elements 70, 72 so that the temperature of the elements is increased. This causes an increase in temperature of the overlapping sheets with the element 70 adjacent the edge of core C serving the function of holding the marginal edge 14 in place.

The combined heat from both heating elements causes a substantial liquefaction between the heating elements in the area designated as 90 in FIGURES 8–10. There is not a substantial liquefaction in other portions of the sheets because the heat energy is only concentrated in area 90. Since pressure is maintained on the heating elements 70, 72 the elements commence to sink into the marginal edge 14 as shown in FIGURE 8.

After a predetermined time, the heating elements 70, 72 are disconnected from generator 76 so that they cool which allows solidification of the plastic material in area 90 to form a tight bond between the two plastic sheets. The heating elements are not lifted from the joint 16 until after solidification has at least commenced so that the heating element 70 continues to maintain the proper overlapping relationship of the sheets as the area 90 cools. The heating elements are positioned relatively close to each other so that there can be a concentration of heat energy in the area of the sheets between the elements. If there were a substantial spacing between the elements, each element would function separately and the element 70 would have a lesser tendency to maintain the proper overlapping relationship of the sheets during the heating operation. Since the heating elements are electrically energized and are nearly touching each other, in accordance with the preferred embodiment of the invention, it is within the contemplation of the present invention to provide insulating coatings 86, 88 on the electrical heating elements 70, 72, respectively. It is appreciated that slight spacing of these elements from each other would allow elimination of this coating if such spacing could be maintained in use.

The innermost edge 92 of marginal edge 14 must be stripped from the door A before ultimate use. Since two heating elements are used and the actual bonding takes place between the elements, it has been found that the innermost edge 92 can be easily stripped from the door as the cooling takes place. To facilitate stripping of edge 92, in accordance with the preferred embodiment of the present invention, the heating element 72 is offset inwardly toward the core C a distance $x$ which respect to the heating element 70. This produces a relatively weak portion directly beneath heating element 72 so that the edge 92 can be easily stripped after the heating has commenced. During the stripping, the element 70 still maintains the proper relationship in the overlapping joint 16. It is appreciated that if only one heating element were used, the plastic liquefaction would take place directly beneath the heating element. Consequently, if the edge 92 were stripped away, the overlapping joint would be released so that a satisfactory bond could not be uniformly produced. It has been found that an inward offset of 0.004–0.005 inch with heating elements having a diameter of substantially 0.040 inch will allow convenient removal of edge 92.

The present invention has been discussed in connection with certain structural embodiments; however, it is appreciated that various changes may be made in these embodiments without departing from the intended spirit and scope of the present invention as defined in the appended claims.

I claim:

1. A method of producing a plastic covered generally flat article, said method comprising the steps of: providing a core having the general shape of said article, applying a thermoplastic sheet on one side of said core, applying a thermoplastic sheet on the other side of said core with the margins being wrapped around said core and forming an overlapped joint with said first mentioned sheet, said joint being on said one side of said core, applying two, generally separate, parallel electric heating elements against said overlapping joint and extending along at least a portion of said joint, applying a force against said joint and said core by said elements, heating said elements to a temperature sufficient to substantially liquefy a portion of said sheets between said elements, allowing said sheets to cool and, then, removing said elements.

2. A method of producing a plastic covered cabinet door, said method comprising the steps of: providing a core having the general shape of said door, gluing a thermoplastic sheet on one side of said core, vacuum forming a thermoplastic sheet around said core to cover said other side and form a marginal edge overlapping said first mentioned sheet, pressing two, generally separate parallel electrical heating elements against said overlapped marginal edge, heating said elements until said sheets are substantially liquid only at a portion between said elements, allowing said sheets to cool until said liquid portion solidifies and, then, releasing said heating elements.

3. An apparatus for covering a thin flat core with a thin covering of plastic material, said apparatus comprising means for attaching a first sheet of the plastic material on one side of said core, means for attaching a second sheet of said plastic material on the opposite side of said core with the marginal edge of said second sheet being wrapped around the edge of said core to form an overlapping joint between said first and second sheets and extending around the periphery of the core, said joint being on said one side of said core, means for supporting said covered core, a pair of parallel, closely spaced, electric heating elements extending coterminously with at least a portion of said joint, means for pressing said electric heating elements against said sheets and said core, and means for passing electric current through said heating elements to liquefy only a portion of said sheets between said elements while said elements are pressing against said joint.

4. An apparatus as defined in claim 3 wherein said element remote from the periphery of said core being offset with respect to said element adjacent said periphery of said core a distance toward said core whereby the marginal edge of said second sheet below said offset element may be severed from said second sheet.

5. An apparatus as defined in claim 4 wherein said periphery of said core is rectangular and said heating elements include two legs forming an angle of approximately 90° with said legs overlying said joint along adjacent edges of said rectangular periphery.

6. An apparatus as defined in claim 4 wherein said legs of said heating element are generally longer than said adjacent edges of the periphery that they overlie.

(References on following page)

References Cited

UNITED STATES PATENTS

| | | | |
|---|---|---|---|
| 2,576,121 | 11/1951 | Kamborian | 156—216 |
| 2,631,646 | 3/1953 | Gannon, et al. | 156—380 |
| 2,705,522 | 4/1955 | Kamborian | 156—216 |
| 2,710,046 | 6/1955 | Markus, et al. | 156—267 |
| 2,937,689 | 5/1960 | Peterson | 156—216 |
| 3,135,077 | 6/1964 | Siegel et al. | 156—515 |
| 3,146,143 | 8/1964 | Bolesky et al. | 156—216 |
| 3,202,561 | 8/1965 | Swanson et al. | 156—216 |
| 3,234,064 | 2/1966 | Smith | 156—267 |

FOREIGN PATENTS 478,851   7/1892   France.

EARL M. BERGERT, *Primary Examiner.*

D. SCHWARTZ, R. A. KILLWORTH,
*Assistant Examiners.*